Figure 1:
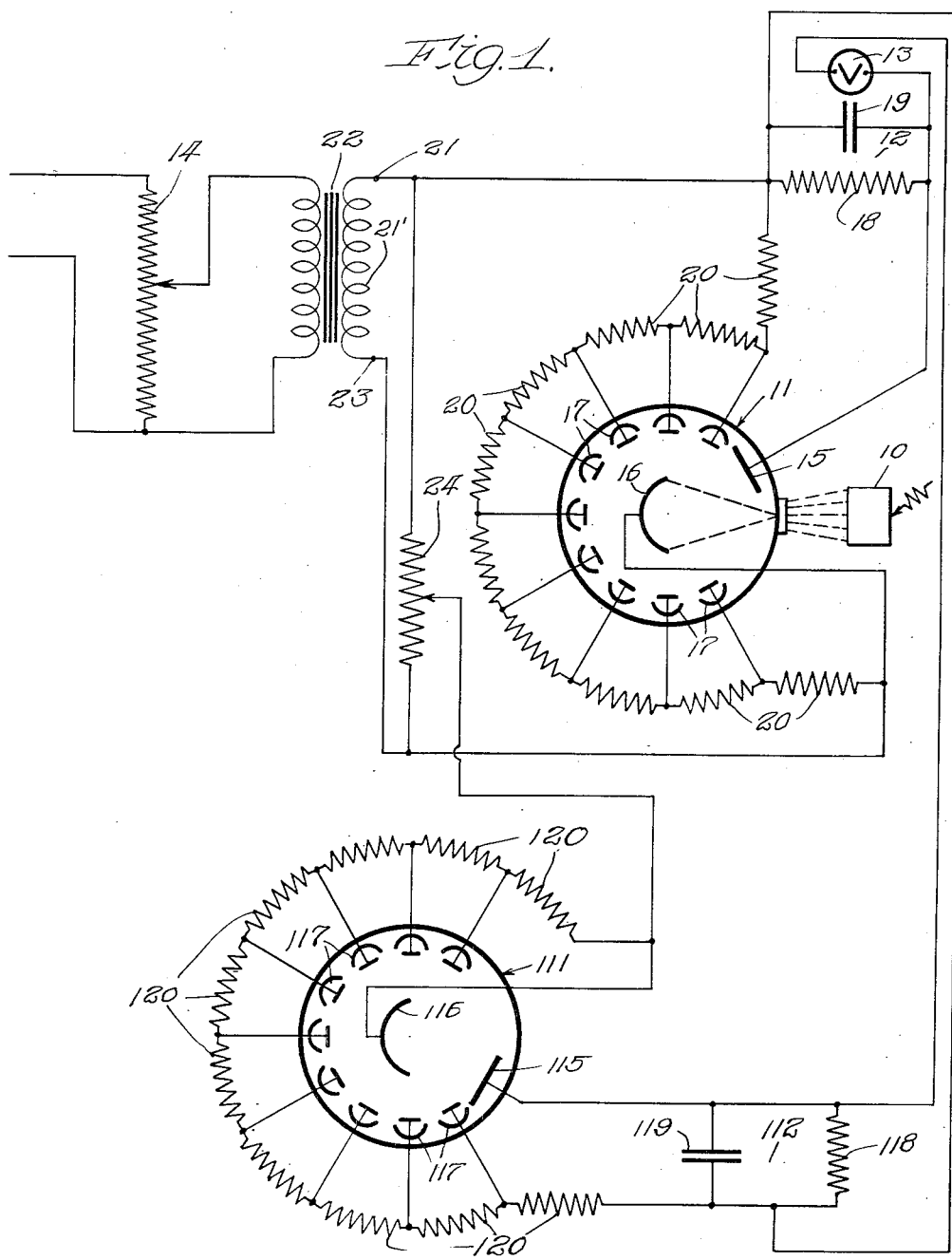

Oct. 8, 1957

L. REIFFEL 2,809,295

RADIATION DETECTOR

Filed April 4, 1952

2 Sheets-Sheet 1

Inventor:
Leonard Reiffel,
By Schroeder, Merriam,
Hofgren & Brady, Attys.

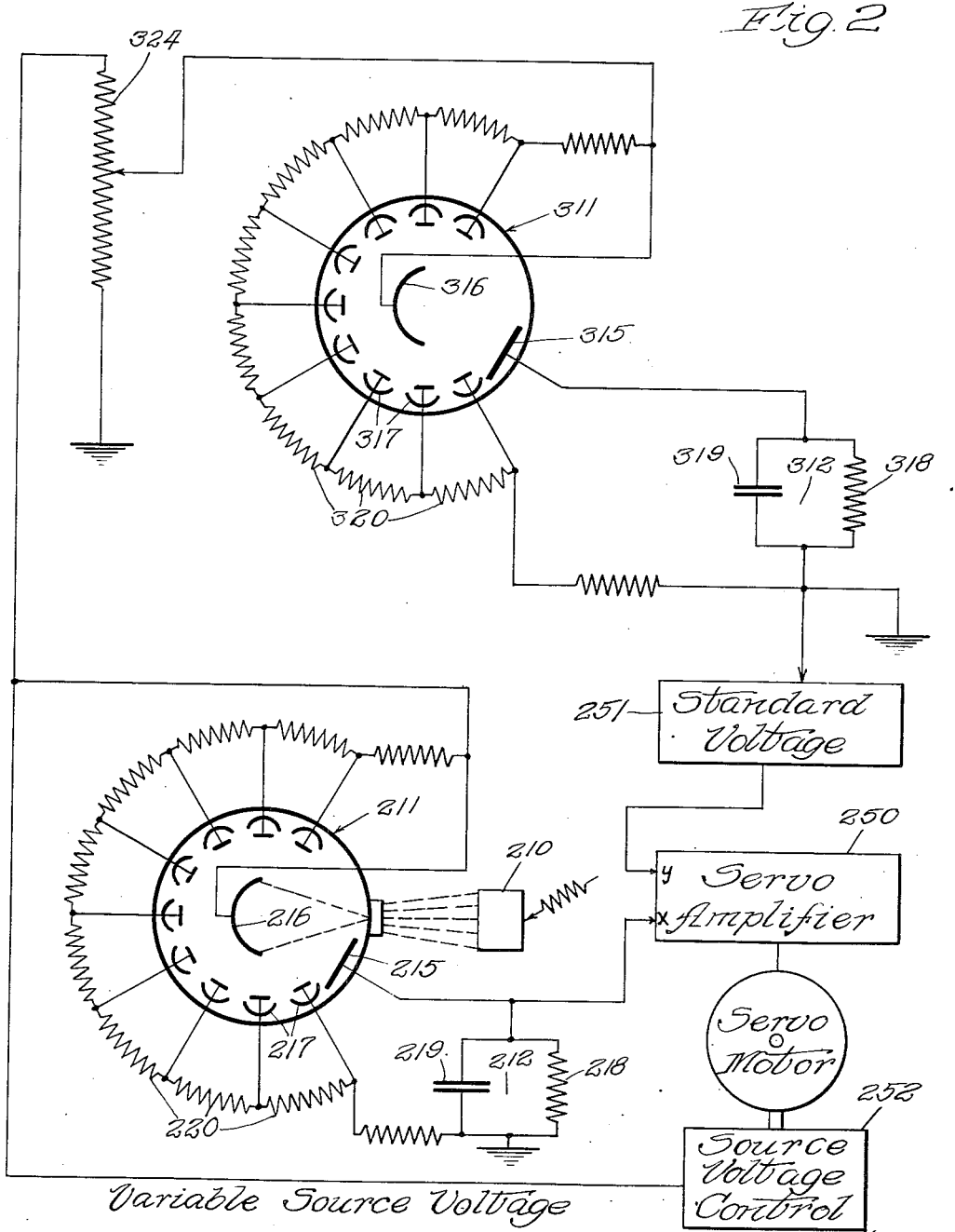

United States Patent Office 2,809,295
Patented Oct. 8, 1957

2,809,295

RADIATION DETECTOR

Leonard Reiffel, Chicago, Ill.

Application April 4, 1952, Serial No. 280,455

7 Claims. (Cl. 250—71)

This invention relates to a radiation detector and more particularly to a scintillation counter detector. It is also useful in other ways which will be described hereinafter.

This application is a continuation-in-part of my co-pending application No. 210,215, filed February 9, 1951, now abandoned.

The basic principles of radiation detection have been known for a number of years. One of the more recent re-discovered types of radiation detectors is the scintillation counter which possesses the combined desirable properties of the other types of radiation detectors and in addition has large output pulses, high gamma ray counting efficiency, extreme speed, and reliability.

Scintillation counters have a solid or liquid material which emit flashes of light when struck by radiation such as alpha, beta, gamma and/or X-rays. Substances having this property are referred to as scintillation material. The light flux so generated is substantially proportional to the quantity of radiation and impinges upon a photo-sensitive tube. The electrical output of the photo-sensitive element being proportional to the light flux is therefore a measure of the radiation. The D. C. source voltage across the circuit incorporating the photo-sensitive element is kept constant so that a measurement of the electrical output of the photo-sensitive element can be calibrated in terms of the amount of radiation striking the scintillation material.

This type of detector is a great improvement in the field of radiation detection, but it has certain critical limitations. Although increasing the range of radiation detectability such that the measured quantity can be varied by a factor of $10^3$, a much greater range is desired, especially in determining the amount of radiation which exists in an area following an atomic bomb attack and/or where a radioactive substance has been deposited. The desired range is from .0001 Roentgen per hour to 5,000 Roentgens per hour or better. The prior scintillation counters are unable to achieve this most useful range due to the fatigue effects of the photo-sensitive element in the circuit when load impedances of the order of $10^4$ ohms are used, or to the dark current effects when high load impedances of the order of $10^9$ ohms are used. As in the other types of detectors, only D. C. voltage is applied across the detector elements in the circuit. This requires the use of rectifiers in A. C. voltage source and makes the instrument quite bulky.

In addition to the above, two other difficulties are encountered. Firstly, the light intensity resulting from nuclear radiation impinging on scintillation material is extremely low, being barely visible even for the best scintillation material. This is particularly true if one desires, as in this case, to measure radiation covering a range of from .0001 to 5,000 Roentgens per hour or better. Under these circumstances the dark current of a photo-sensitive element such as a multi-stage photo-multiplier tube is of the same order of magnitude as the current produced by the emitted light striking the tube. This dark current varies with changes in temperature and it is therefore important to cancel out the dark current from a photo-sensitive element in a scintillation counter.

The other difficulty encountered is in the statistical fluctuations in the average light intensity at extremely low levels together with the statistical fluctuations in the time of arrival of any particular gamma ray, beta ray, or the like. These effects combine to require a long "integrating time" in order that the true average illumination level of light intensity emitted from the scintillation material may be measured by a scintillation counter.

I have invented and am herewith disclosing and claiming a radiation detector wherein all of the above disadvantages of prior scintillation counters are overcome and full advantage is taken of their desirable characteristics. The detector of this invention overcomes the difficulties encountered in detecting and measuring extremely low levels of light intensity resulting from nuclear radiation striking scintillation material. My invention also provides a radiation detector which is reliable; accurate over a very large range of radiation, i. e., the measured quantity may be varied over a factor of $10^8$ or more instead of a factor of $10^3$; possesses high alpha, beta, neutron and gamma ray counting efficiencies; is capable of using A. C. source voltage without the necessity of rectification; is capable of using D. C. source voltage directly; and can be made portable. Other features and advantages of my invention will be apparent from the following specification and drawings in which:

Fig. 1 is a schematic drawing of a basic scintillation counter designed and constructed in accordance with my invention; and Fig. 2 is a block drawing of a basic scintillation counter incorporating my invention and adapted for automatic indication of radiation level.

Referring to the drawings, Fig. 1 illustrates the basic operation of my new improvements in a scintillation counter circuit. In such a circuit nuclear radiation, which is here defined as alpha, beta, neutron, gamma and/or X-rays, striking scintillation material 10 is translated into substantially proportional light flux which strike the cathode 16 of the multi-stage photo-multiplier tube 11. This tube translates the light into proportional electrical variations in the circuit which are integrated by the load impedance 12 to provide average electrical variation levels, indicated on the voltmeter 13. By properly adjusting the potentiometer 14 the source voltage across the secondary is varied to compensate for the electrical change in the circuit brought about by the light rays impinging on the tube 11, and the electrical output of the tube 11 can be returned to a predetermined value. In this way the potentiometer can be readily calibrated in terms of radiation intensity and the apparatus used to detect and measure unknown amounts of radiation. The dark current effect of tube 11 is cancelled out by a second multi-stage photo-multiplier tube 111 so connected in the circuit that the dark current signal from this tube opposes and is equal to the dark current signal from the tube 11. As here shown, the tube 111 is in parallel connection with the tube 11.

In the detector which I constructed, the scintillation material 10 was composed of a solution of terphenyl in xylene. This was positioned so that light emitted therefrom as a result of nuclear radiation striking the solution was directed toward the cathode 16 of tube 11.

The anode 15 of the multi-stage photo-multiplier tube 11 (of the type 931A, having an anode 15, a cathode 16, and nine intermediate electrodes or dynodes, as 17) was connected to an integrating impedance 12, consisting of a 40 megohm load resistor 18 in parallel with a 0.05 microfarad capacitor 19. The capacitor 19 integrates the statistically fluctuating output voltage of tube 11 so that the voltage across the load resistor 18 has a small degree of fluctuation and is substantially proportional to the true average illumination level of light caused to be emitted from the scintillation material 10 by nuclear radiation striking the material. It is to be noted that the fluctuating output voltage of the tube 11 is proportional to and varies in accordance with the statistical fluctuations in the average light intensity from the scintillation material at extremely low levels and with the statistical fluctuations in the time of arrival of any particular beta ray, gamma ray or the like striking the scintillation material. These fluctuations require a long "integrating time" in order to obtain a true average illumination level for nuclear radiation of the order of 50 milliroentgens per hour and less. As here shown, this achieved by utilization of capacitor 19. However, it is to be understood that this invention is not limited to an integrating capacitor connected in parallel with a load resistor.

For illumination levels corresponding to an average scintillator in a gamma radiation field of $10^{-4}$ Roentgens per hour, the "integrating time" is of the order of about 2 to 3 seconds and the 0.05 microfarad capacitor obtains this condition.

The ten series-connected dividing or bleeder resistors 20 were in parallel with the series connected load impedance 12 and tube 11, one end going to one terminal 21 of the secondary of transformer 22, the other in common with the cathode 16 of the tube 11, and terminal 23 of the secondary of transformer 22. Each of the nine dynodes were connected to one of the dividing resistors. Nine of these resistors each had a value of 1.5 megohms; the tenth, a value of 0.3 megohm to reduce ionic regeneration in the tube. The secondary source voltage from the transformer 22, was impressed across the series connected load impedance 12 and the tube 11. The 110 volt, 60 cycle line voltage was fed into the primary of transformer 22 through a potentiometer 14, having a value of 10K ohms, 2W.

In order to cancel out the effect of dark current signal from the tube 11, a second multi-stage photomultiplier tube 111 was connected in parallel with tube 11 through a variable impedance 24 which was connected across the secondary of the transformer 22. This second tube was similar to the first tube, being of the type 931A, but having a dark current signal equal to or greater than that of the tube 11 under the same operating conditions. This second tube had an anode 115, a cathode 116 and nine intermediate electrodes or dynodes, as 117. The cathode 116 of the tube 111 was connected to the arm of a potentiometer 24, the potentiometer being connected across the secondary outlets 21 and 23 of the transformer 22. The anode 115 was connected to the anode 15 of tube 11 through a vacuum tube voltmeter 13. This voltmeter is employed to indicate the integrated output voltage of tube 11. One end of the ten series connected dividing or bleeder resistors 120 was connected to the cathode 116 and the other end, to the anode 15 side of transformer 22's secondary. A load impedance 112 was connected between this last named end of the bleeder resistors and the anode 115. Like the load impedance 12, it consisted of a 40 megohms load resistor 118 in parallel with a 0.05 microfarad capacitor 119. Each of the nine dynodes 117 was connected to one of the dividing resistors 120. Nine of these resistors each had a value of 1.5 megohms and the tenth, a value of 0.3 megohm to reduce ionic regeneration in the tube 111.

In general, no two tubes have the same dark currents for the same temperature and same operating voltages. This condition can be adjusted by taking an appropriate percentage of the voltage applied to the tube 11 and applying it to the tube 111. As here shown, this was accomplished by connecting the cathode 116 of tube 111 to the arm of the potentiometer 24 which in turn was connected across the source voltage from the secondary of transformer 22. By changing the position of the arm of the potentiometer 24 while both tubes are operating without any additional light source being directed toward either tube, a percentage of the source voltage applied to the tube 11 may be applied to tube 111 so that the amount of dark current signal from tube 111 is equal to and opposes the dark current signal from tube 11. By means of this arrangement and after proper adjustment of the voltage applied to the tube 111, the dark current signal of tube 11 will be cancelled in spite of subsequent variations in temperature.

It is to be noted that by connecting the two tubes in the above described manner, the dark current signal from tube 111 opposes, i. e., tends to cancel out, the dark current signal from tube 11 so that the vacuum tube voltmeter 13 only reads the integrated electrical output from the tube 11 resulting from the light intensity from the scintillation material.

The detector was calibrated in terms of radiation in the following manner: the potentiometer 14 was set to give peak source voltage of about 1200 volts across the secondary of the transformer 22 with substantially no light impinging on the cathodes of either tube. The arm of the potentiometer 24 was adjusted until a reading of 0 volts was indicated on the voltmeter 13. Under such condition, the amount of dark current signal from the tube 11 was equal to and opposite the dark current signal from tube 111 and the dark current signal from the tube 11 will be cancelled irrespective of subsequent changes in temperature and radiation reading.

A very small source of known radiation (of the order of 0.005 Roentgen) was placed near the scintillation material 10. The light emanating from the scintillation material struck the cathode 16 of the multi-stage photo-multiplier tube 11 causing proportional electrical variations in the output of tube 11. These variations were integrated by the integrating load impedance 12 to provide average electrical levels proportional to the average illumination levels of light striking the cathode 16. The dial reading of the vacuum tube voltmeter 13 indicated the integrated electrical output of tube 11 and was marked. The scintillation material was then exposed to a larger known quantity of radiation (of the order of 10 Roentgens per hour) and the potentiometer 14 varied until the voltmeter reading was the same as for 0.005 Roentgen per hour. The dial setting of the potentiometer 14 for this position was marked, representing a measurement of 10 Roentgens per hour. The procedure was carried out for other larger known values of radiation and the corresponding potentiometer settings marked for those values.

The scintillation material was then exposed to unknown amounts of radiation. For each unknown amount the potentiometer 14 was adjusted to maintain a voltmeter dial reading for 0.005 Roentgen per hour. The setting of the potentiometer in each instance was a measure of the unknown radiation. I was able to measure radiation intensities which varied over a factor of more than $10^8$.

The elements comprising my basic circuit as shown and described can be replaced with elements performing the same functions. For example, the vacuum tube voltmeter can be replaced by an electrostatic voltmeter or any other instrument which will indicate changes in the electrical output of the photo-sensitive element. Different types of photo-sensitive tubes may be used. The voltage source can be D. C. rather than A. C. and the value of the load impedance can be varied greatly. Any material emitting light flashes when struck by radiation can be used as scintillating material for converting the radiation particle's energy into proportional light intensity. A large number of these substances exist in both liquid and solid form. The potentiometer 14 can be replaced by any device which will vary the source voltage, such as a variac and the potentiometer 24 can be replaced by any device which will enable one to impress a desired percentage of source voltage across the tube 111, such as a variable tap from the secondary of transformer 22.

It is to be understood that this invention is not limited to the above described circuit arrangement, particularly with regards to the manner in which tube 111 is connected to the circuit of tube 11. For example, the tube 111 may be connected between the two vacuum tubes in the vacuum tube voltmeter 13 in such a way that the voltmeter only reads the electrical current signals due to light impinging upon the cathode 16 of tube 11, the dark current signal of tube 11 being cancelled by the dark current signal from tube 111.

Figure 2 illustrates how my invention may be used to automatically detect and measure radiation intensity. As here shown, scintillation material 210 is positioned so that light emitted therefrom as a result of radiation striking the material was directed toward the cathode 216 of tube 211.

This tube and its circuit are substantially similar to that for tube 11. The anode 215 of the multi-stage photo-multiplier tube 211 (of the type 931A, having an anode 215, a cathode 216 and nine intermediate electrodes or dynodes, as 217) was connected to an integrating load impedance 212 and to an input terminal X of the servo amplifier 250. The other side of the integrating load impedance was connected to ground. This integrating load impedance 212 consisted of a 40 megohms load resistor 218 in parallel with a 0.05 microfarad capacitor 219. The cathode 216 was connected to a variable source voltage and the ten series-connected dividing or bleeder resistors 220 were connected between the ground side of the integrating load impedance 212 and the cathode 216.

In order to cancel out the effect of dark current signal from the tube 211, a second multi-stage photo-multiplier tube 311 was connected in the circuit. This second tube was similar to tube 211, being of the type 931A, but having a dark current signal equal to or greater than that of the tube 211 under the same operating conditions. This tube also had an anode 315, a cathode 316 and nine intermediate electrodes or dynodes, as 317. The cathode 316 of the tube 311 was connected to the arm of a potentiometer 324, the potentiometer being connected between ground and the variable source voltage. The anode 315 of this tube was connected in series with an integrating load impedance 312 which in turn was connected to a predetermined independent standard voltage 251. The side of the integrating load impedance which was connected to the standard voltage 251 was also connected to ground. This integrating load impedance is similar to that of the one associated with tube 211 and consists of a 40 megohms load resistor 318 in parallel with a 0.05 microfarad capacitor 319.

The ten series connected dividing or bleeder resistors 320 were connected between the cathode 316 and the ground side of the integrating load impedance 312. Each of the nine dynodes was connected to one of the dividing resistors 320. Nine of these resistors each had a value of 1.5 megohms and the tenth, a value of 0.3 megohm to reduce ionic regeneration in the tube.

The predetermined independent standard voltage 251 is equal to the signal voltage resulting from the detection of a very small known amount of radiation material (of the order of 0.005 Roentgen per hour) and is also fed into an input terminal Y of the servo amplifier 250.

In operation, radiation striking the scintillation material 210 is translated into light which impinges upon the cathode 216 of the multi-stage photo-multiplier tube 211. A signal voltage, proportional to the impinging light intensity is set up in the circuit of tube 211, being integrated by the integrating impedance 212. The integrated output signal voltage from tube 211 is fed into the input terminal X of the servo amplifier 250 along with the dark current signal from tube 211. At the same time, a predetermined independent standard voltage 251 equal to the signal voltage resulting from the detection of a very small known amount of material (of the order of 0.005 Roentgen per hour) and the dark current signal from tube 311 is also fed into the servo amplifier 251 at input terminal Y. It is to be noted that at terminal Y appears a voltage proportional to the sum of the dark current signal voltage in tube 311 and the standard voltage, whereas at terminal X appears a voltage proportional to the sum of the dark current signal in tube 211 and the signal due to the light intensity from the scintillation material. By proper adjustment of the potentiometer 324, the voltage proportional to the dark current signal in tube 211 may be made equal to the voltage proportional to the dark current signal in the tube 311. Under such condition the voltage difference between input terminal Y and input terminal X is the voltage difference between the standard voltage and the signal voltage, the dark current signal in tube 311 cancelling the dark current signal of tube 211. The resultant voltage difference is amplified and impressed across the input of the servo-motor causing the motor to turn. The shaft of the servo-motor is connected to the source voltage control 252 and adjusts it until the signal voltage proportional to the light intensity from the radiation material 210 equals the standard voltage at which time the servo-motor stops. Thus, the degree of rotation of the servo-motor shaft is related to the radiation intensity impinging on the scintillation material 210 and can be calibrated to indicate quantities of radiation intensity. There are many ways of automatically adjusting the source voltage control. The above description serves merely as an example.

If desired, an alarm system may be incorporated in my invention so that when a predetermined amount of radiation is exposed to my radiation detector, the alarm is set off.

Although the above detailed description of my invention has been limited to detection and measurement of radiation translatable into light, it can be readily used in detecting and measuring light directly.

The term "light" as used in the specification and claims means visual light rays, ultra-violet rays and infra-red rays. The term "photo-sensitive element" as used in the specification and claims refers to the electronic tubes which are photo-sensitive to light rays, ultra-violet rays or infra-red rays. The term "radiation" as used in the specification and claims is defined as meaning electro-magnetic waves and corpuscular rays.

Having described my invention in considerable detail, it is my intention that the invention be not limited by any of the details or description, but rather be construed broadly within the spirit and scope as set out in the accompanying claims.

I claim:

1. In a system where radiation is converted into light, an apparatus for detecting and measuring the intensity of this light which comprises a multi-stage photo-multiplier tube; a load impedance connected in series with the tube; a source of voltage across the series connected load impedance and the tube; an integrating element electrically connected to said tube to integrate the electrical output of the tube; indicating means also electrically connected with the tube and responding to changes in the integrated electrical output of the tube; and means for automatically varying the source of voltage to maintain a substantially constant predetermined integrated electrical output of the multi-stage photo-multiplier tube for variations in light intensity impinging on the tube.

2. The apparatus of the character claimed in claim 1 in which an automatic feedback servo system automatically varies the source voltage to maintain the substantially constant predetermined integrated electrical output of the tube for variations in light intensity on said tube.

3. In a system where radiation is converted into light, an apparatus for detecting and measuring the intensity of the light which comprises a first multi-stage photo-multiplier tube; a load impedance electrically connected in series with said first tube; a source of voltage across the series connected load impedance and said first tube; indicating means electrically connected to said first tube and responding to changes in the electrical output of said first tube; a second multi-stage photo-multiplier tube electrically connected to said first tube and for canceling dark current signal indications from the first tube; and means electrically connected to said first tube for varying the source of voltage to maintain a substantially constant predetermined electrical output of the first tube for variations in light intensity impinging thereon, said second multi-stage photo-multiplier having an electrical circuit associated therewith including adjustable means for impressing a desired percentage of the source of voltage across the second tube.

4. In a system where radiation is converted into light, an apparatus for detecting and measuring the intensity of this light comprising: a first multi-stage photo-multiplier tube; a load impedance connected in series relation to the first tube; a source of voltage across the series connected load impedance and first tube; an integrating element electrically connected to the first tube to integrate the electrical output of said first tube; indicating means also electrically connected to said first tube and responding to changes in the integrated electrical output of said first tube; a second multi-stage photo-multiplier tube connected electrically in parallel relation with the said first tube for canceling dark current signal indications from the first tube; and means including an automatic feedback servo system for automatically varying the source of voltage to maintain a substantially constant predetermined integrated electrical output of the first tube for variations in light intensity impinging on the first tube.

5. A detector for converting radiation into light and measuring the intensity of this light which comprises a first multi-stage photo-multiplier tube including an anode, cathode and intermediate electrodes arranged therebetween; scintillation material for translating radiation into light and positioned to direct this light toward the cathode of the first tube; bleeder impedance means connected to the intermediate electrodes of the first tube for impressing voltage therebetween; a load impedance connected in electrical series relation with the first tube; a source voltage across the series connected load impedance and first tube and across the bleeder impedance means; indicating means in circuit relation with the first tube responsive to changes in the electrical output of the first tube; control means for varying the source voltage to maintain a constant predetermined electrical output of the first tube for variations in the light intensity from the scintillation material impinging on the cathode of the first tube; a variable impedance across the source voltage; a second multi-stage photo-multiplier tube including a second anode, a second cathode and second intermediate electrodes therebetween; bleeder impedance means connected to the intermediate electrodes of the second tube for impressing voltage therebetween, the second cathode being connected to said variable impedance, the second anode being connected to the first anode through the indicating means, one end of the second bleeder impedance means being connected to the second cathode and the other end being connected to the first cathode through a load impedance and to the first anode side of the source voltage.

6. A detector for converting radiation into light and measuring the intensity of this light which comprises a first multi-stage photo-multiplier tube including an anode, cathode and intermediate electrodes arranged therebetween; integrating load impedance means connected in electrical series relation with the first tube to integrate the electrical output therefrom; a source voltage across the series connected load impedance and the first tube and across the bleeder impedance means; indicating means in circuit relation with the tube and responding to changes in the integrated electrical output of the first tube; control means for varying the source voltage to maintain a constant predetermined integrated electrical output of the first tube for variation in the light intensity from the scintillation material impinging on the cathode of the first tube; a variable impedance across the source voltage; a second multi-stage photo-multiplier tube including a second anode, a second cathode and second intermediate electrodes therebetween; bleeder impedance means connected to the intermediate electrodes of the second tube for impressing voltage therebetween, the second cathode being connected to said variable impedance, the second anode being connected to the first anode through the indicating means, one end of the second bleeder impedance means being connected to the second cathode and the other end being connected to the first cathode through a load impedance and to the first anode side of the source voltage.

7. Apparatus of the character claimed in claim 6 wherein an automatic feedback servo system automatically varies the source voltage to maintain a constant predetermined integrated electrical output from the first multi-stage photo-multiplier tube for variations in light intensity impinging on the cathode of said first tube.

References Cited in the file of this patent

UNITED STATES PATENTS

| | | |
|---|---|---|
| 2,407,564 | Martin et al. | Sept. 10, 1946 |
| 2,417,023 | Sweet | Mar. 4, 1947 |
| 2,565,265 | Peterson | Aug. 21, 1951 |
| 2,571,838 | Connor et al. | Oct. 16, 1951 |